(12) United States Patent
Dire et al.

(10) Patent No.: US 9,908,949 B2
(45) Date of Patent: Mar. 6, 2018

(54) CONTINUOUS SYNTHESIS METHOD FOR A MODIFIED DIENE ELASTOMER, FACILITY FOR IMPLEMENTING SAME

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Charlotte Dire, Clermont-Ferrand (FR); Jean-Marc Marechal, Clermont-Ferrand (FR); Margarita Dorato, Clermont-Ferrand (FR); Mathieu Manceau, Clermont-Ferrand (FR); Nuno Pacheco, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/910,213

(22) PCT Filed: Jul. 11, 2014

(86) PCT No.: PCT/EP2014/064977
§ 371 (c)(1),
(2) Date: Feb. 4, 2016

(87) PCT Pub. No.: WO2015/018599
PCT Pub. Date: Feb. 12, 2015

(65) Prior Publication Data
US 2016/0176991 A1 Jun. 23, 2016

(30) Foreign Application Priority Data

Aug. 8, 2013 (FR) ..................... 13 57888

(51) Int. Cl.
| | | |
|---|---|---|
| C08C 19/25 | (2006.01) | |
| C08C 19/44 | (2006.01) | |
| C08L 15/00 | (2006.01) | |
| B01J 19/18 | (2006.01) | |

(Continued)

(52) U.S. Cl.
CPC ............ C08C 19/25 (2013.01); B01J 19/18 (2013.01); B01J 19/1862 (2013.01); B01J 19/245 (2013.01); B01J 19/2415 (2013.01); C08C 19/44 (2013.01); C08F 236/10 (2013.01); C08L 15/00 (2013.01); B01J 2219/00033 (2013.01); B01J 2219/24 (2013.01)

(58) Field of Classification Search
CPC .......... C08J 2325/10; C08F 36/06; C07F 7/18
See application file for complete search history.

(56) References Cited

U.S. PATENT DOCUMENTS

| 6,362,272 B1 | 3/2002 | Tadaki et al. | |
|---|---|---|---|
| 2011/0041976 A1* | 2/2011 | Saeki | B60C 1/0016 152/538 |

FOREIGN PATENT DOCUMENTS

| EP | 0992537 A1 | 4/2000 |
|---|---|---|
| WO | 2009/077837 A1 | 6/2009 |

OTHER PUBLICATIONS

Subramanian (The Canadian Journal of Chemical Engineering, vol. 52, Oct. 1974 pp. 563-568).*

(Continued)

Primary Examiner — Kuo-Liang Peng
(74) Attorney, Agent, or Firm — Dickinson Wright PLLC

(57) ABSTRACT

A continuous method for synthesizing a diene elastomer includes modifying the diene elastomer in a functionalizing device by:
  a kinetic model according to which the ratio of the rate constants is greater than 1, and
  a flow represented by a residence time distribution in the functionalizing device that is expressed according to equations 1 or 3:
  (i) in a functionalizing device having at least one tubular continuous reactor or having at least one cascade of at least two stirred reactors, $$E_1(t) = \frac{1}{2}\left(\frac{P}{\pi\theta_1 t}\right)^{\frac{1}{2}} e^{-\frac{P(\theta_1-t)^2}{4\theta_1 t}} \quad \text{Eq 1}$$

(ii) in a functionalizing device that is a combination of the device (i) and of a device having at least one continuous stirred reactor, having a residence time distribution characterized by the following equation:

$$E_2(t) = \frac{e^{\left(-\frac{t}{\theta_2}\right)}}{\theta_2} \quad \text{Eq 2}$$

the device (ii) having a residence time distribution characterized by the equation 3 below, which is the result of the convolution of equations 1 and 2:

$$E_{12}(t) = \int_0^t E_1(t-T)E_2(T)\,dT \quad \text{Eq 3}$$

$$E_{12}(t) = \int_0^t \frac{1}{2}\left(\frac{P}{\pi\theta_1(t-T)}\right)^{\frac{1}{2}} e^{-\frac{P(\theta_1-(t-T))^2}{4\theta_1(t-T)}} \frac{e^{\left(-\frac{T}{\theta_2}\right)}}{\theta_2}\,dT$$

21 Claims, 4 Drawing Sheets

(51) Int. Cl.
*B01J 19/24* (2006.01)
*C08F 236/10* (2006.01)

(56) References Cited

OTHER PUBLICATIONS

International Search Report for Application PCT/EP2014/ 064977 dated Nov. 4, 2014.
Chemical Engineering Science, 1964, vol. 19, pp. 413-422. Pergamon Press Ltd., Oxford. Printed in Great Britain: The effect of axial diffusion processes on the optimum yield of tubular reactors—II Variable temperatures, simple reversible reaction . . . ; J. Adler.

\* cited by examiner

CONTINUOUS SYNTHESIS METHOD FOR A MODIFIED DIENE ELASTOMER, FACILITY FOR IMPLEMENTING SAME This application is a 371 national phase entry of PCT/EP2014/064977, filed 11 Jul. 2014, which claims benefit of French Patent Application No. 1357888, filed 8 Aug. 2013, the entire content of which is incorporated herein by reference for all purposes.

BACKGROUND

1. Field

The present invention relates to a continuous method for synthesizing a diene elastomer that is modified by an alkoxysilane group.

2. Description of Related Art

Now that savings in fuel and the need to protect the environment have become a priority, it is desirable to produce polymers having good mechanical properties and a hysteresis that is as low as possible in order to be able to process them in the form of rubber compositions that can be used for the manufacture of various semi-finished products that are incorporated in the composition of tires. In order to achieve the objective of the drop in hysteresis, many solutions have already been tested. In particular, mention may be made of the modification of the structure of the diene polymers and copolymers at the end of the polymerization using functionalizing agents for the purpose of obtaining a good interaction between the polymer thus modified and the filler, whether this is carbon black or a reinforcing inorganic filler. It has in particular been proposed to use diene polymers functionalized by alkoxysilane derivatives. By way of illustration of this prior art relative to reinforcing inorganic fillers, mention may for example be made of U.S. Pat. No. 5,066,721 and patent application EP A 0 299 074.

It has also been proposed to combine functionalization by amine functions with functionalization by alkoxysilane functions. By way of illustration of this prior art, mention may for example be made of patent EP 0 992 537 which describes an extended elastomer that is modified at the chain end by an alkoxysilane function and that bears, at the other end or along its chain, one or more amine functions.

Furthermore, elastomers have also been proposed that are functionalized at the chain end by alkoxysilane functions bearing an amine group. Mention may be made, for example, of patent application US 2005/0203251 which describes an elastomer functionalized at the chain end by an alkoxysilane bearing an amine group.

The applicant companies have described, in document WO 2009/133068 A1, a functionalized diene elastomer essentially consisting of the species coupled by an elastomer having within the chain a group bearing an alkoxysilane function and an amine function, the silicon atom of this group bonding the two parts of the diene elastomer chain. This functionalized elastomer gives the composition containing it improved mechanical and dynamic properties, especially an improved hysteresis while maintaining a satisfactory processability in the uncured state, with a view in particular to use as a tire tread.

For those who develop materials intended for the manufacture of tires, improving the compromise of mechanical and dynamic properties of the rubber compositions, with a view to improving the performance of the tire containing them, is a constant preoccupation. This concern for improving the compromise of properties must, in so far as possible, come under an approach that aims to minimize the impact on the aspects further upstream which are, for example, the synthesis of the components of rubber compositions and their specific characteristics.

In U.S. Pat. No. 7,807,747 B2, it has been proposed to improve in particular the processability of a functionalized elastomer by using a single functionalizing agent, an alkoxysilane compound bearing an amine function, by targeting a specific distribution of the species within the elastomer. The strategy consists in adding the amine-containing alkoxysilane compound, preferably amine-containing trialkoxysilane compound, in two steps during the functionalizing step: i) first addition in an amount such that the n(amine-containing trialkoxysilane)/n(butyl lithium) molar ratio is between 0.05 and 0.35, ii) then second addition in an amount such that the final n(amine-containing trialkoxysilane)/n(butyl lithium) molar ratio is greater than or equal to 0.5. This process makes it possible to obtain a functional diene elastomer mixture comprising 40 to 80% by weight of chain-end functionalized elastomer, 5 to 45% by weight of elastomer functionalized in the middle of the chain and 3 to 30% by weight of star-shaped elastomer. The functionalized elastomer is synthesized according to a batch process.

The modification of the elastomers is an important means for improving the properties of the rubber compositions containing them with a view to improving the performance of the tire containing them. Yet it is observed that in the past the processes for modifying a diene elastomer requiring a control of the distribution of the species within the modified elastomer are essentially carried out in batch mode. Only the batch process makes it possible to refine the content of each species. Yet such a process is not always productive and sufficiently competitive and economic for industrial production.

SUMMARY

The technical problem that the invention proposes to solve is to be able to have a method of synthesis that is competitive, economic and flexible, suitable for industrial production, which makes it possible to control the distribution of the species within a modified diene elastomer.

The present invention proposes a continuous method, the functionalizing step of which is characterized by a particular residence time distribution and a specific kinetic model, which solves this technical problem in the sense that it makes it possible to control the proportions of the various species of a modified elastomer. By thus controlling the distribution of the species within the modified elastomer, it is possible to improve the properties of rubber compositions containing it. Since the method of the invention is a continuous method, it is particularly suitable for an economically advantageous industrial production with increased competitiveness.

One subject of the invention is therefore a method for the continuous synthesis of a modified diene elastomer comprising a step referred to as a "polymerization step" during which the living diene elastomer is synthesized and a step referred to as a "functionalizing step" or "modifying step" during which the living diene elastomer reacts with a specific functionalizing agent comprising a trialkoxysilane group and where appropriate another function capable of interacting with a reinforcing filler, the latter step being characterized in particular by a determining kinetic model and a particular flow represented by a specific residence time distribution.

Another subject of the invention is the diene elastomer modified by a trialkoxysilane functionalizing agent optionally bearing a function capable of interacting with a reinforcing filler, synthesized by such a method.

Another subject of the invention is a system intended for the implementation of this continuous synthesis method and that is suitable for an industrial-scale application.

DETAILED DESCRIPTION OF THE SPECIFIC EMBODIMENTS

Figure 1:
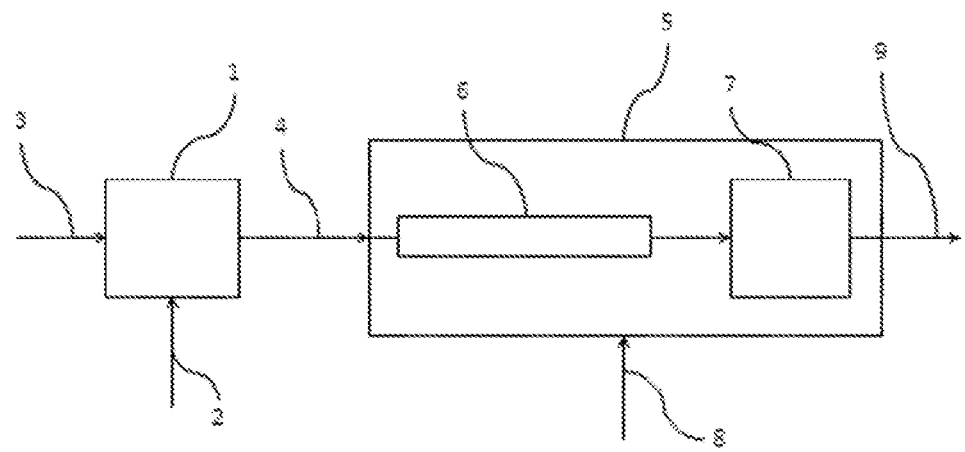
FIG. 1 is a diagram of a system that may be incorporated into a unit for the continuous preparation of a modified diene elastomer in accordance with one embodiment of the invention according to which the modifying device comprises one tubular-type reactor and one continuous stirred reactor.

In the present description, unless expressly indicated otherwise, all the percentages (%) indicated are % by weight. Moreover, any range of values denoted by the expression "between a and b" represents the range of values extending from more than a to less than b (i.e. with limits a and b excluded), whereas any range of values denoted by the expression "from a to b" signifies the range of values extending from a through to b (i.e. including the strict limits a and b).

In the present description, a modified diene elastomer according to an embodiment of the invention is understood to mean a diene elastomer that comprises a group comprising a silicon atom, directly bonded to the elastomer chain, and, where appropriate, a function capable of interacting with a reinforcing filler. It is the elastomer obtained by the implementation of the continuous synthesis method that is the subject of an embodiment of the invention comprising the modification of the elastomer by means of a trialkoxysilane functionalizing agent bearing, where appropriate, a function capable of interacting with a reinforcing filler.

When the group lies at the chain end, it will then be said that the diene elastomer is chain-end functionalized.

When the group lies in the linear main elastomer chain, it will then be said that the diene elastomer is coupled or else functionalized in the middle of the chain, as opposed to the "chain end" position, even though the group does not lie precisely in the middle of the elastomer chain. The silicon atom of this group bonds the two fragments of the diene elastomer chain.

When the group is central, to which three elastomer chains or branches are bonded forming a star-shaped structure of the elastomer, it will then be said that the diene elastomer is star-shaped. The silicon atom of this group bonds the three branches of the modified diene elastomer together.

In the present description, a "group" or "function capable of interacting with a reinforcing filler" is understood to mean any group or function capable of forming, within a rubber composition reinforced by means of a filler, a physical or chemical bond with said filler. This interaction may be established, for example, by means of covalent, hydrogen, ionic and/or electrostatic bonds between said function and functions present on fillers.

A first subject of the invention is a method for the continuous synthesis of a modified diene elastomer, characterized in that it comprises the steps:

of anionic polymerization of at least one conjugated diene monomer in the presence of a polymerization initiator, of modification of the diene elastomer in a functionalizing device, by bringing the living diene elastomer bearing an active site obtained in the previous step into contact, in a single step, with a non-polymerizable functionalizing agent comprising (a) where appropriate, a function capable of interacting with a reinforcing filler and (b) a trialkoxysilane group, the optionally hydrolysable alkoxy radical having 1 to 10 carbon atoms, the modification comprising three reactions in series

| Reaction | Mechanism |
|---|---|
| R1 | $PLi + A \xrightarrow{k_1} PA$ |
| R2 | $PLi + PA \xrightarrow{k_2} P_2A$ |
| R3 | $PLi + P_2A \xrightarrow{k_3} P_3A$ | where
  A represents the functionalizing agent,
  PLi represents a living elastomer chain,
  PA represents the chain-end functionalized elastomer,
  $P_2A$ represents the coupled elastomer,
  $P_3A$ represents the three-arm star-shaped elastomer, and
  $k_i$ represents the rate constant of the reaction $R_i$,
that are carried out according to the following rate law:

| Reactions | Rate of reaction |
|---|---|
| R1 | $V_1 = k_1[PLi][A]$ |
| R2 | $V_2 = k_2[PLi][PA]$ |
| R3 | $V_3 = k_3[PLi][P_2A]$ | where
  $k_1$, $k_2$ and $k_3$ are the rate constants respectively of the reactions R1, R2 and R3 (expressed in $(m^3/mol) \cdot s^{-1}$),
  [PLi] is the concentration of living chains (expressed in $mol/m^3$),
  [A] is the concentration of modifying agent A (expressed in $mol/m^3$),
  [PA] is the concentration of chain-end functionalized elastomer (expressed in $mol/m^3$),
  $[P_2A]$ is the concentration of coupled elastomer (expressed in $mol/m^3$),
  $[P_3A]$ is the concentration of the three-arm star-shaped elastomer (expressed in $mol/m^3$), the ratio K of the rate constants defined as:

$$K = \frac{k_1}{k_2} = \frac{k_2}{k_3}$$

being greater than 1, and
the residence time distribution in the functionalizing device being expressed according to equations 1 or 3 below:
(i) in a functionalizing device having at least one tubular continuous reactor or having at least one cascade of at least two stirred reactors, $$E_1(t) = \frac{1}{2}\left(\frac{P}{\pi\theta_1 t}\right)^{\frac{1}{2}} e^{-\frac{P(\theta_1-t)^2}{4\theta_1 t}} \quad \text{Eq 1}$$

in which:
P is the dimensionless parameter of resistance to dispersion,
$\theta_1$ is the residence time defined as the reactor volume/total volume flow rate ratio, preferably equal to at least 0.1 minute and at most to 10 minutes, more preferably at most to 5 minutes,
t is the variable time of the residence time distribution,
(ii) in a functionalizing device that is a combination of the device (i) and of a device having at least one continuous stirred reactor, having a residence time distribution characterized by the following equation:

$$E_2(t) = \frac{e^{\left(-\frac{t}{\theta_2}\right)}}{\theta_2} \quad \text{Eq 2}$$

in which:
$\theta_2$ is the residence time defined as the reactor volume/total volume flow rate ratio, preferably between 0 and 60 minutes, more preferably between 5 and 50 minutes,
t is the variable time of the residence time distribution, the device (ii) having a residence time distribution characterized by the equation 3 below, which is the result of the convolution of equations 1 and 2:

$$E_{12}(t) = \int_0^t E_1(t-T)E_2(T)\,dT \quad \text{Eq 3}$$

$$E_{12}(t) = \int_0^t \frac{1}{2}\left(\frac{P}{\pi\theta_1(t-T)}\right)^{\frac{1}{2}} e^{-\frac{P(\theta_1-(t-T))^2}{4\theta_1(t-T)}} \frac{e^{\left(-\frac{T}{\theta_2}\right)}}{\theta_2}\,dT$$

in which:
$\theta_1$ and $\theta_2$ are the residence times as defined above,
P is the dimensionless parameter of resistance to dispersion,
t is the variable time of the residence time distribution,
T is the integration variable.

In these equations, P is the dimensionless parameter of resistance to dispersion as defined in the bibliography "Villermeaux, J; Génie de la réaction chimique [Chemical reaction engineering]; 1993". It is preferably greater than 6.9, more preferably greater than or equal to 9.6, or even greater than or equal to 12. P is not limited by a maximum value within the context of an embodiment of the invention. It may tend towards infinity. If it tends towards infinity, the device in which the functionalization takes place then acts as an ideal plug-flow reactor.

The method that is the subject of an embodiment of the invention comprises a first step of anionic polymerization of at least one conjugated diene monomer in the presence of a polymerization initiator.

The anionic polymerization may be carried out continuously in a manner known per se. The polymerization generally takes place at temperatures between 0° C. and 110° C. and preferably from 60° C. to 100° C., or even from 70° C. to 90° C. The temperature may be kept constant throughout this step or may be variable, depending on the targeted characteristics of the elastomer synthesized. The polymerization process may be carried out in solution, in a more or less concentrated or dilute medium. The polymerization solvent is preferably an inert hydrocarbon solvent which may be, for example, an aliphatic or alicyclic hydrocarbon such as pentane, hexane, heptane, isooctane, cyclohexane or methylcyclohexane or an aromatic hydrocarbon such as benzene, toluene or xylene.

Suitable conjugated diene monomers are in particular 1,3-butadiene, 2-methyl-1,3-butadiene, 2,3-di(C1-C5 alkyl)-1,3-butadienes such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

According to certain variants of the method of the invention, the conjugated diene monomer may be homopolymerized.

According to other variants of the method of the invention, the conjugated diene monomer may be copolymerized with one or more conjugated diene monomers and/or with one or more vinylaromatic compounds having from 8 to 20 carbon atoms. Suitable vinylaromatic compounds are in particular styrene, ortho-, meta- or para-methylstyrene, the "vinyltoluene" commercial mixture, para-(tert-butyl)styrene, methoxystyrenes, vinylmesitylene, divinylbenzene, vinyl-naphthalene, etc.

These variants can be combined with the preferred or alternative variants and aspects described below.

As polymerization initiator, use may be made of any known monofunctional anionic initiator. However, an initiator containing an alkali metal such as lithium is preferably used. Suitable organolithium initiators are in particular those comprising a carbon-lithium bond and a nitrogen-lithium bond. Representative compounds are aliphatic organolithium compounds such as ethyllithium, n-butyllithium (n-BuLi), isobutyllithium, and the lithium amides obtained from a cyclic secondary amine, such as pyrrolidine and hexamethyleneimine.

The diene elastomer may have any microstructure which depends on the polymerization conditions used. The elastomer may be a block, random, sequential, microsequential, etc. elastomer. The microstructure of this elastomer may be determined by the presence or absence of a modifying and/or randomizing agent and on the amounts of modifying and/or randomizing agent used.

The anionic polymerization of at least one conjugated diene monomer in the presence of a polymerization initiator generates elastomer chains having a reactive site at the chain end which can be represented by a schematic formula: PLi, P representing the elastomer chain, and Li a lithium atom. Reference is then commonly made to a living elastomer or living chain. These living chains or living elastomers then react with the functionalizing agent.

One of the essential elements of an embodiment of the invention lies in the choice of this functionalizing agent in order to correspond to the kinetic model of the functionalization defined above with a ratio of the rate constants, denoted by K, of greater than 1. This ratio K is preferably greater than or equal to 10, or even greater than or equal to 100. Below this value of 1, the distribution of the various species leads to a modified elastomer, the use of which in a reinforced rubber composition results in processing and hysteresis properties that are not always optimized for satisfactory use as a tire tread. There is no upper limit of K. A person skilled in the art will understand that the higher K is, the more the reaction is controlled by the molar ratio of the functionalizing agent to polymerization initiator. When this value tends towards infinity, the method is quantitative and stoichiometric.

The functionalizing agent in accordance with an embodiment of the invention may bear, on the silicon atom, hydrolysable alkoxy groups or else non-hydrolysable alkoxy groups, and optionally a function capable of interacting with a reinforcing filler, the two functions being bonded to one another directly or by means of a spacer group. The function capable of interacting with a reinforcing filler and the spacer group are as defined below.

According to variants of the invention, the functionalizing agent may be represented by the following formula 1:

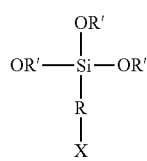

Formula 1 in which,
R, a spacer group, is a $C_1$-$C_{18}$ cyclic or non-cyclic, saturated or unsaturated, aliphatic or $C_6$-$C_{18}$ aromatic divalent hydrocarbon radical, preferably a $C_1$-$C_{10}$ aliphatic, linear or branched, divalent hydrocarbon radical, more preferably a $C_1$-$C_6$ aliphatic, linear, divalent hydrocarbon radical, more preferably still the $C_3$ linear hydrocarbon radical, X is a hydrogen atom or a function capable of interacting with a reinforcing filler, the R' radicals, which are substituted or unsubstituted, identical or different, represent a $C_1$-$C_{10}$, or even $C_1$-$C_8$, alkyl group, preferably a $C_1$-$C_4$ alkyl group, more preferably methyl and ethyl.

The aforegoing various preferred or non-preferred aspects can be combined with one another.

According to variants of the invention, the functionalizing agent comprises no other function than that comprising the silicon atom of trialkoxysilane type.

According to other variants of the invention, the functionalizing agent comprises a function capable of interacting with a reinforcing filler. This wording does not however exclude the possibility of the function comprising the silicon atom also interacting with a reinforcing filler.

A function capable of interacting with a reinforcing filler is understood preferably to mean functions comprising at least one heteroatom selected from N, S, O, P. By way of example, mention may be made, among these functions, of cyclic or non-cyclic, primary, secondary or tertiary amines, isocyanates, imines, cyano compounds, thiols, carboxylates, epoxides and primary, secondary or tertiary phosphines.

Thus, according to variants of the invention, the function capable of interacting with a reinforcing filler is a protected or unprotected primary amine, a protected or unprotected secondary amine or a tertiary amine. The nitrogen atom may then be substituted by two identical or different groups, possibly being a trialkylsilyl radical, the alkyl group having 1 to 4 carbon atoms, or a $C_1$-$C_{10}$ alkyl, preferably $C_1$-$C_4$ alkyl radical, more preferably a methyl or ethyl radical, or else the two substituents of the nitrogen form with the latter a heterocycle containing a nitrogen atom and at least one carbon atom, preferably 2 to 6 carbon atoms.

Mention may for example be made, as a functionalizing agent where the function capable of interacting with a reinforcing filler is an amine, of (N,N-dialkylaminopropyl)trialkoxysilanes, (N-alkylaminopropyl)trialkoxysilanes where the secondary amine function is protected by a trialkylsilyl group and aminopropyltrialkoxysilanes where the primary amine function is protected by two trialkylsilyl groups. The alkyl substituents present on the nitrogen atom are linear or branched and advantageously have from 1 to 10, preferably 1 to 4, more preferably 1 or 2 carbon atoms. For example, the following are suitable as alkyl substituents: methylamino-, dimethylamino-, ethylamino-, diethylamino, propylamino-, dipropylamino-, butylamino-, dibutylamino-, pentylamino-, dipentylamino, hexylamino, dihexylamino and hexamethyleneamino groups, preferably diethylamino and dimethylamino groups. The alkoxy substituents are linear or branched and generally have from 1 to 10, or even 1 to 8, preferably 1 to 4, more preferably 1 or 2 carbon atoms.

Preferably, the functionalizing agent may be selected from 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)-triethoxysilane, 3-(N,N-dipropylaminopropyl)trimethoxysilane, 3-(N,N-dipropyl-aminopropyl)triethoxysilane, 3-(N,N-dibutylaminopropyl)trimethoxysilane, 3-(N,N-dibutylaminopropyl)triethoxysilane, 3-(N,N-dipentylaminopropyl)trimethoxysilane, 3-(N,N-dipentylaminopropyl)triethoxysilane, 3-(N,N-dihexylaminopropyl)-trimethoxysilane, 3-(N,N-dihexylaminopropyl)triethoxysilane, 3-(hexamethyleneaminopropyl)trimethoxysilane, 3-(hexamethyleneaminopropyl)triethoxysilane, 3-(morpholinopropyl)trimethoxysilane, 3-(morpholinopropyl)triethoxysilane, 3-(piperidinopropyl)trimethoxysilane and 3-(piperidinopropyl)triethoxysilane. More preferably, the functionalizing agent is 3-(N,N-dimethylaminopropyl)trimethoxysilane.

Preferably, the functionalizing agent may be selected from 3-(N,N-methyl-trimethylsilylaminopropyl)trimethoxysilane, 3-(N,N-methyltrimethylsilylaminopropyl)triethoxysilane, 3-(N,N-ethyltrimethylsilylaminopropyl)trimethoxysilane, 3-(N,N-ethyltrimethylsilylaminopropyl)triethoxysilane, 3-(N,N-propyltrimethylsilylaminopropyl)trimethoxysilane and 3-(N,N-propyltrimethylsilylaminopropyl)triethoxysilane. More preferably, the functionalizing agent is 3-(N,N-methyl-trimethylsilylaminopropyl)trimethoxysilane.

Preferably, the functionalizing agent may be selected from 3-(N,N-bis(trimethylsilyl)aminopropyl)trimethoxysilane and 3-(N,N-bis(trimethylsilyl)amino-propyl)triethoxysilane. More preferably, the functionalizing agent is 3-(N,N-bis(trimethylsilyl)aminopropyl)trimethoxysilane.

According to variants of the invention, the function capable of interacting with a reinforcing filler is an isocyanate function. Preferably, the functionalizing agent may be selected from 3-(isocyanatopropyl)trimethoxysilane and 3-(isocyanatopropyl)triethoxysilane.

According to variants of the invention, the function capable of interacting with a reinforcing filler is an imine function. Preferably the functionalizing agent may be selected from N-(1,3-dimethylbutylidene)-3-(trimethoxysilyl)-1-propanamine, N-(1,3-dimethylbutylidene)-3-(triethoxysilyl)-1-propanamine, N-(1,3-methylethylidene)-3-(trimethoxysilyl)-1-propanamine, N-(1,3-methylethylidene)-3-(triethoxysilyl)-1-propanamine, N-ethylidene-3-(trimethoxysilyl)-1-propanamine, N-ethylidene-3-(triethoxysilyl)-1-propanamine, N-(1-methylpropylidene)-3-(trimethoxysilyl)-1-propanamine, N-(1-methylpropylidene)-3-(triethoxysilyl)-1-propanamine, N-(4-N,N-dimethylaminobenzylidene)-3-(trimethoxysilyl)-1-propanamine, N-(4-N,N-dimethylaminobenzylidene)-3-(triethoxysilyl)-1-propanamine, N-(cyclohexylidene)-3-(trimethoxysilyl)-1-propanamine, N-(cyclohexylidene)-3-(triethoxysilyl)-1-propanamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole and N-(3-triethoxysilylpropyl)-4,5-imidazole.

According to variants of the invention, the function capable of interacting with a reinforcing filler is a cyano function. Preferably the functionalizing agent may be selected from 3-(cyanopropyl)trimethoxysilane and 3-(cyanopropyl)triethoxysilane.

According to variants of the invention, the function capable of interacting with a reinforcing filler is a protected or unprotected thiol function. By way of example, mention may be made of (S-trialkylsilylmercaptopropyl)trialkoxysilanes. Preferably the functionalizing agent may be selected from (S-trimethylsilyl-mercaptopropyl)trimethoxysilane, (S-trimethylsilylmercaptopropyl)triethoxysilane, (S-(tert-butyl)dimethylsilylmercaptopropyl)trimethoxysilane and (S-(tert-butyl)-dimethylsilylmercaptopropyl)triethoxysilane.

According to variants of the invention, the function capable of interacting with a reinforcing filler is a carboxylate function. Mention may be made, as carboxylate function, of acrylates or methacrylates. Such a function is preferably a methacrylate. Preferably, the functionalizing agent may be selected from 3-(methacryloyloxypropyl)trimethoxysilane and 3-(methacryloyloxypropyl)triethoxysilane.

According to variants of the invention, the function capable of interacting with a reinforcing filler is an epoxide function. Preferably the functionalizing agent may be selected from 2-(glycidyloxyethyl)trimethoxysilane, 2-(glycidyloxyethyl)triethoxysilane, 3-(glycidyloxypropyl)trimethoxysilane, 3-(glycidyloxypropyl)triethoxysilane, 2-(3,4-epoxycyclohexyl)ethyltrimethoxysilane and 2-(3,4-epoxycyclohexyl)ethyltriethoxysilane.

According to variants of the invention, the function capable of interacting with a reinforcing filler is a protected or unprotected primary phosphine, protected or unprotected secondary phosphine or tertiary phosphine function. Preferably, the functionalizing agent may be selected from 3-(P, P-bis(trimethylsilyl)phosphino-propyl)trimethoxysilane, 3-(P, P-bis(trimethylsilyl)phosphinopropyl)triethoxysilane, 3-(methyltrimethylsilylphosphinopropyl)trimethoxysilane, 3-(methyltrimethylsilylphosphinopropyl)triethoxysilane, 3-(ethyltrimethylsilylphosphinopropyl)trimethoxysilane, 3-(ethyltrimethylsilylphosphinopropyl)triethoxysilane, 3-(dimethylphosphinopropyl)trimethoxysilane, 3-(dimethylphosphinopropyl)triethoxysilane, 3-(diethylphosphinopropyl)trimethoxysilane, 3-(diethylphosphinopropyl)triethoxysilane, 3-(ethylmethylphosphinopropyl)trimethoxysilane, 3-(ethylmethylphosphinopropyl)triethoxysilane, 3-(diphenylphosphinopropyl)trimethoxysilane and 3-(diphenylphosphinopropyl)triethoxysilane.

These functionalizing agents satisfy one of the essential criteria according to which the ratio of the rate constants K is greater than 1, preferably greater than or equal to 10, or even greater than or equal to 100.

According to advantageous variants of the invention, at least one of the following three features, and preferably all three features, is (are) respected:
  the function capable of interacting with a reinforcing filler is a tertiary amine, more particularly diethylamine or dimethylamine,
  the spacer group is a $C_1$-$C_6$ aliphatic, linear, divalent hydrocarbon radical, more preferably still the $C_3$ linear hydrocarbon radical,
  in the trialkoxysilane group, the alkyl radicals are identical and have 1 to 4, preferably 1 or 2 carbon atoms.

The molar ratio of the coupling agent to the metal of the polymerization initiator depends essentially on the type of modified diene elastomer that is desired. Thus, with a ratio ranging from 0.40 to 0.75, preferably from 0.45 to 0.65 and more preferably still from 0.45 to 0.55, the formation of coupled species within the modified elastomer is favoured. Similarly, with a ratio ranging from 0.15 to 0.40, preferably from 0.20 to 0.35, more preferably still from 0.30 to 0.35, star-shaped species (3 arms) are predominantly formed within the modified elastomer. With a ratio greater than or equal to 0.75, preferably greater than 1, chain-end functionalized species are predominantly formed.

Another essential element of the modification step according to an embodiment of the invention lies in the continuous contacting of the living diene elastomer and of the functionalizing agent in a functionalizing device, composed of at least one reactor, having a residence time distribution characterized by one of the equations 1 and 3 above.

The combination of the functionalizing kinetic model defined above with the model of the functionalizing reaction device that satisfies equation 1 or equation 3, makes it possible to obtain, according to a continuous method suitable for economically advantageous industrial production, a modified diene elastomer with a control of the distribution of the species within the elastomer.

It is especially possible, by the implementation of the method of an embodiment of the invention, to carry out the synthesis of a novel modified diene elastomer in a competitive, economical and flexible manner which is suitable for industrial production, which novel modified diene elastomer gives a composition containing it an optimal compromise of hysteresis property and processing in the uncured state, without adversely affecting the properties of the elastomer, especially its cold flow resistance. For example, it is possible to directly obtain this modified diene elastomer by modifying the living diene elastomer with a molar ratio of functionalizing agent to polymerization initiator within the range of from 0.48 to 0.52. This elastomer comprises:
  a) at least 55% by weight, relative to the total weight of the modified diene elastomer, of a species coupled by a functional group bearing a function of formula —SiOR, in which R is a hydrogen atom or an alkyl radical having 1 to 10 carbon atoms, and optionally a function capable of interacting with a reinforcing filler, the group being bonded to the two arms of the diene elastomer by means of the silicon atom, b) from 5% by weight to 30% by weight, relative to the total weight of the modified diene elastomer, of a star-shaped species having three elastomer arms connected to one and the same silicon atom belonging to a functional group optionally bearing a function capable of interacting with a reinforcing filler, c) a content less than or equal to 15% by weight, relative to the total weight of the modified diene elastomer, of a species chain-end functionalized by a functional group bearing a —Si(OR)$_2$ function, in which R is a hydrogen atom or an alkyl radical having 1 to 10 carbon atoms, and optionally a function capable of interacting with a reinforcing filler, the group being bonded to the diene elastomer by means of the silicon atom, and d) a content less than or equal to 15% by weight, relative to the total weight of the modified diene elastomer, of non-functional diene elastomer.

This modified diene elastomer is also the subject of an embodiment of the present invention. It gives the rubber compositions containing it a remarkable and unexpected improvement of the processing in the uncured state/hysteresis compromise, while maintaining a satisfactory cold flow resistance without the addition of an additional coupling or star-branching agent.

Regarding the star-shaped species b), the modified diene elastomer preferably comprises at least 10% by weight, relative to the total weight of the modified diene elastomer, of said star-shaped species b). Also preferably, the modified diene elastomer comprises at most 25%, more preferably at most 20% by weight, relative to the total weight of the modified diene elastomer, of said star-shaped species b).

Regarding the non-functional species d), the modified diene elastomer preferably comprises a content of strictly greater than 0% by weight and less than 10% by weight, relative to the total weight of the modified diene elastomer, of said non-functional species d).

Regarding the coupled species a), the modified diene elastomer preferably comprises a content of greater than or equal to 65%, or even greater than or equal to 70%, by weight, relative to the total weight of the modified diene elastomer, of said coupled species a).

Regarding the chain-end functionalized species c), the modified diene elastomer preferably comprises a content of less than or equal to 10% by weight, relative to the total weight of the modified diene elastomer, of said chain-end functionalized species c).

The preferred aspects regarding the species a), b), c) and d) can be combined with one another.

A diene elastomer is understood according to an embodiment of the invention to mean any homopolymer obtained by polymerization of a conjugated diene monomer having from 4 to 12 carbon atoms, or any block, random, sequential or microsequential copolymer, obtained by copolymerization of one or more conjugated dienes with one another or with one or more vinylaromatic compounds having from 8 to 20 carbon atoms. In the case of copolymers, these contain from 20% to 99% by weight of diene units, and from 1% to 80% by weight of vinylaromatic units.

Preferably, the diene elastomer is selected from polybutadienes, butadiene-styrene copolymers, butadiene-styrene-isoprene copolymers, styrene-isoprene copolymers, butadiene-isoprene copolymers and synthetic polyisoprene. Advantageously, the diene elastomer is a butadiene-styrene copolymer.

The method for synthesizing the modified diene elastomer according to an embodiment of the invention may be followed, in a manner known per se, by the steps of recovering the modified elastomer.

According to the variants of the invention according to which the functionalizing agent bears a protected primary or secondary amine function, the method of synthesis may be followed by a step of deprotecting the primary or secondary amine. This step is carried out after the modification reaction. By way of example, it is possible to react the chains functionalized by the protected amine group with an acid, a base, a fluorinated derivative such as tetrabutylammonium fluoride, a silver salt such as silver nitrate, etc. in order to de-protect this amine function. These various methods are described in the book "Protective Groups in Organic Synthesis, T. W. Green, P. G. M. Wuts, Third Edition, 1999". This deprotecting step may have the effect of hydrolysing all or some of the hydrolysable alkoxysilane functions of the modified diene elastomer in order to convert them into silanol functions.

According to the variants of the invention according to which the functionalizing agent bears a protected thiol function, the method of synthesis may be followed by a step of deprotecting the thiol. This step is carried out after the modification reaction. By way of example, it is possible to react the chains functionalized by the protected thiol group with water, an alcohol or an acid (hydrochloric acid, sulphuric acid, carboxylic acid). This deprotecting step may have the effect of hydrolysing all or some of the hydrolysable alkoxysilane functions of the modified diene elastomer in order to convert them into silanol functions.

According to the variants of the invention according to which the functionalizing agent bears a protected primary or secondary phosphine function, the method of synthesis may be followed by a step of deprotecting the phosphine. This step is carried out after the modification reaction. By way of example, it is possible to react the chains functionalized by the protected phosphine group with water, an alcohol or an acid (hydrochloric acid, sulphuric acid, carboxylic acid). This deprotecting step may have the effect of hydrolysing all or some of the hydrolysable alkoxysilane functions of the modified diene elastomer in order to convert them into silanol functions.

According to variants of the invention, the method of synthesis may comprise a step of hydrolysis of the hydrolysable alkoxysilane functions, by addition of an acidic, basic or neutral compound as described in document EP 2 266 819 A1. The hydrolysable functions are then converted into silanol functions.

The method for synthesizing the modified diene elastomer according to an embodiment of the invention may be followed, in a manner known per se, by the steps of recovering the modified elastomer.

According to variants of this method, the steps comprise a stripping step with a view to recovering the elastomer from the prior steps in dry form. This stripping step may have the effect of hydrolysing all or some of the hydrolysable alkoxysilane functions of the modified diene elastomer in order to convert them into silanol functions. Advantageously, at least 50 to 70 mol % of the functions may thus be hydrolysed.

Another subject of the invention is any system intended for the implementation of the method for the continuous synthesis of a diene elastomer that is suitable for industrial-scale application.

The system according to an embodiment of the invention comprises a polymerization device fed continuously by a stream of monomers and a stream of anionic polymerization initiator. The system according to an embodiment of the invention also comprises a modifying device fed continuously by a stream of living elastomer from the polymerization reactor and by a stream of functionalizing agent.

The polymerization device may consist, in a manner known per se, of at least one polymerization reactor. It may be modelled on at least one continuous stirred reactor, presumed to be perfectly stirred.

The device for the functionalization of the living diene elastomer must enable a flow that satisfies one of equations 1 and 3 defined above. Thus, this device may be modelled on one of the following models:

a tubular reactor with axial dispersion, or alternatively a tubular reactor with axial dispersion, in series with at least one continuous stirred reactor, presumed to be perfectly stirred, or alternatively, at least one tubular reactor with axial dispersion, in series with a continuous stirred reactor, presumed to be perfectly stirred, or alternatively, several tubular reactors with axial dispersion, in series with several continuous stirred reactors, presumed to be perfectly stirred, or alternatively, at least two continuous stirred reactors, presumed to be perfectly stirred, in series.

The residence time in each tubular reactor with axial dispersion is preferably between 0 and 10 minutes, more preferably between 0.1 and 5 minutes.

The residence time in each continuous perfectly stirred reactor, presumed to be perfectly stirred, is preferably between 5 and 60 minutes, more preferably between 10 and 50 minutes, By way of illustration and non-limitingly, two systems for the continuous synthesis of a diene elastomer in accordance with two embodiments of the method of synthesis of an embodiment of the invention are more particularly described with reference to FIGS. 1 and 2, each forming a schematic representation of a system.

FIG. 1 is a diagram of a system that may be incorporated into a unit for the continuous preparation of a modified diene elastomer in accordance with one embodiment of the invention according to which the modifying device comprises one tubular-type reactor and one continuous stirred reactor.

Figure 2:
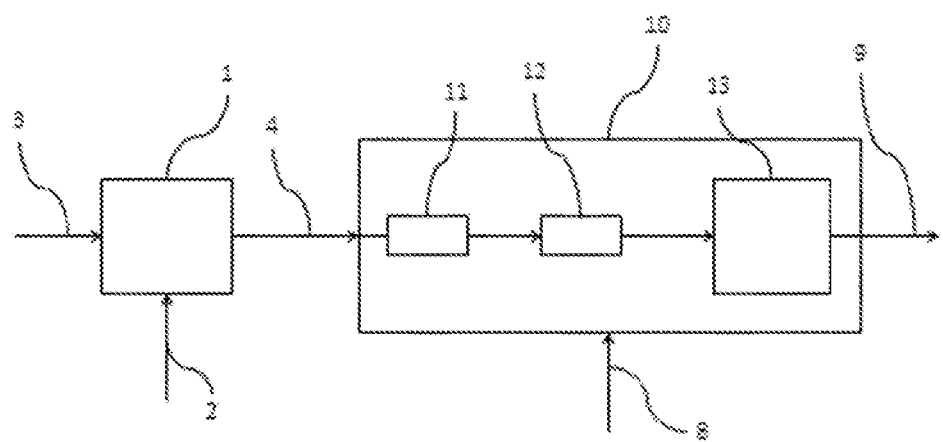
FIG. 2 is a diagram of a system that may be incorporated into a unit for the continuous preparation of a modified diene elastomer in accordance with one embodiment of the invention according to which the modifying device comprises two tubular-type reactors and one continuous stirred reactor.

FIG. 2 is a diagram of a system that may be incorporated into a unit for the continuous preparation of a modified diene elastomer in accordance with one embodiment of the invention according to which the modifying device comprises two tubular-type reactors and one continuous stirred reactor.

The system illustrated in FIG. 1 comprises a polymerization reactor 1 at least connected to:

several continuous supply sources including at least a source 2 for supplying polymerization initiator, a source 3 for supplying at least one monomer, where appropriate mixed with an inert hydrocarbon-based solvent, and an outlet suitable for discharging from said reactor 1, continuously, the living diene elastomer as an outgoing stream 4 leaving via a discharge device.

The system illustrated in FIG. 1 also comprises a device 5 for functionalizing the living diene elastomer downstream of the polymerization reactor 1.

The functionalizing device is composed of two reactors in series, namely a reactor 6 of tubular type with Kenics static mixer and a continuous stirred reactor 7, presumed to be perfectly stirred.

The functionalizing device 5 is at least provided with:

an inlet connected to a source for supplying elastomer discharged from the polymerization reactor 1, an inlet connected to a source 8 for supplying functionalizing agent, and an outlet suitable for discharging from the functionalizing device, continuously, the modified elastomer as an outgoing stream 8.

The outgoing stream of modified elastomer 9 is conveyed, downstream of the production line, to a device for recovering the modified diene elastomer, not illustrated in the figure. This device may comprise conventional elements such as for example a granulator, a device intended for eliminating the solvent, the residual monomer(s), the residual reactant(s) (functionalizing agent, etc.), etc.

The system illustrated in FIG. 2 comprises the same elements as those represented in FIG. 1, up to the polymerization reactor 1.

The difference lies in the functionalizing device 10, which is composed, in the system illustrated in FIG. 2, of two tubular-type reactors 11 and 12 and one continuous stirred reactor 13.

The aforementioned features of the present invention, and others, will be better understood on reading the following description of several exemplary embodiments of the invention, given by way of illustration and non-limitingly.

I—Measurements and Tests Used (a) Determination of the Distribution of Molar Masses of the Elastomers by the Size Exclusion Chromatography (Conventional SEC) Technique The SEC (Size Exclusion Chromatography) technique makes it possible to separate the macromolecules in solution, according to their size, through columns filled with a porous gel. The macromolecules are separated according to their hydrodynamic volume, the bulkiest being eluted first.

Without being an absolute method, SEC makes it possible to determine the distribution of the molar masses of a polymer. From commercial standard products, the various number-average molar masses ($M_n$) and weight-average molar masses ($M_w$) can be determined and the polydispersity index ($I_p = M_w/M_n$) calculated via a "Moore" calibration.

There is no particular treatment of the polymer sample before analysis. This sample is simply dissolved in the elution solvent at a concentration of around 1 g·L$^{-1}$. Then the solution is filtered through a filter with a porosity of 0.45 μm before injection.

The equipment used is a "Waters Alliance" chromatographic chain. The elution solvent is either tetrahydrofuran or tetrahydrofuran+1 vol % of diisopropylamine+1 vol % of triethylamine, the flow rate is 1 mL·min$^{-1}$, the temperature of the system is 35° C. and the analysis time is 30 min. A set of two Waters columns having the trade name "Styragel HT6E" is used. The injected volume of the solution of the polymer sample is 100 μL. The detector is a "Waters 2410" differential refractometer and the software for processing the chromatographic data is the "Waters Empower" system.

The average molar masses calculated are relative to a calibration curve produced for SBRs having the following microstructure: 25 wt % of styrene type units, 23 wt % of 1,2-type units and 50 wt % of trans-1,4-type units.

(b) Determination of the Distribution of the Chain-End, Middle-Chain and 3-Arm Star-Shaped Functionalized Chains by the High-Resolution Size Exclusion Chromatography (High-Resolution SEC) Technique The high-resolution SEC technique is used to determine the weight percentages of the various populations of chains present in a polymer sample.

There is no particular treatment of the polymer sample before analysis. This sample is simply dissolved in the elution solvent at a concentration of around 1 g·L⁻¹. Then the solution is filtered through a filter with a porosity of 0.45 µm before injection.

The equipment used is a "Waters Alliance 2695" chromatographic chain. The elution solvent is tetrahydrofuran, the flow rate is 0.2 mL·min⁻¹ and the temperature of the system is 35° C. A set of three identical columns in series is used (Shodex, length 300 mm, diameter 8 mm). The number of theoretical plates of the set of columns is greater than 22 000. The injected volume of the solution of the polymer sample is 50 µL. The detector is a "Waters 2414" differential refractometer and the software for processing the chromatographic data is the "Waters Empower" system.

The molar masses calculated are relative to a calibration curve produced for SBRs having the following microstructure: 25 wt % of styrene type units, 23 wt % of 1,2-type units and 50 wt % of trans-1,4-type units.

(c) Characterization of the Microstructure of the Elastomers by the Near Infrared (NIR) Spectroscopy Technique Near infrared (NIR) spectroscopy is used to quantitatively determine the weight content of styrene in the elastomer and also the microstructure thereof (relative distribution of the 1,2-, trans-1,4- and cis-1,4-butadiene units). The principle of the method is based on the Beer-Lambert law applied to a multicomponent system. Since the method is indirect, it requires a multivariate calibration [Vilmin, F.; Dussap, C.; Coste, N. Applied Spectroscopy 2006, 60, 619-29] carried out using standard elastomers having a composition determined by $^{13}$C NMR. The styrene content and the microstructure are then calculated from the NIR spectrum of an elastomer film of around 730 µm in thickness. The spectrum is acquired in transmission mode between 4000 and 6200 cm⁻¹ with a resolution of 2 cm⁻¹, using a Bruker Tensor 37 Fourier transform near infrared spectrometer equipped with a Peltier-cooled InGaAs detector.

(d) Determination of the Mooney $ML_{(1+4)}$100° C. Viscosities for the Elastomers and the Rubber Compositions According to the ASTM D-1646 Standard Use is made of an oscillating consistometer as described in the ASTM D-1646 standard. The Mooney plasticity measurement is carried out according to the following principle: the elastomer (or the composition in the uncured state (i.e. before curing)) is moulded in a cylindrical chamber heated to 100° C. After preheating for one minute, the rotor rotates within the test specimen at 2 rpm and the working torque for maintaining this movement is measured after rotating for four minutes. The Mooney plasticity ($ML_{(1+4)}$) is expressed in "Mooney units" (MU, with 1 MU=0.83 N·m).

(e) Determination of the Glass Transition Temperatures (Tg) of the Elastomers Using a Differential Calorimeter ("Differential Scanning Calorimeter").

(f) Determination of the Inherent Viscosity of the Elastomers at 25° C. Starting from a 0.1 g·dL⁻¹ Solution of Elastomer in Toluene, According to the Following Principle:

The inherent viscosity is determined by the measurement of the flow time t of the polymer solution and of the flow time $t_0$ of toluene, in a capillary tube.

The flow time of toluene and the flow time of the 0.1 g·dL⁻¹ polymer solution are measured in a Ubbelhode tube (diameter of the capillary: 0.46 mm, capacity of 18 to 22 mL), placed in a bath thermostatically controlled at 25±0.1° C.

The inherent viscosity is obtained by the following relationship:

$$\eta_{inh} = \frac{1}{C}\ln\left[\frac{(t)}{(t_0)}\right]$$

with:
C: concentration of the toluene solution of polymer in g·dL⁻¹,
t: flow time of the toluene solution of polymer in seconds,
$t_0$: flow time of the toluene in seconds,
$\eta_{inh}$: inherent viscosity expressed in dL·g⁻¹.

The measurement of the "initial" inherent viscosity, which is the viscosity of the polymer before functionalization, and of the "final" inherent viscosity, which is the viscosity of the polymer after functionalization, makes it possible to calculate the change in viscosity which is the ratio of said "final" inherent viscosity to said "initial" inherent viscosity.

(g) Determination of the Cold Flow of the Elastomers ($CF_{(1+6)}$100° C.) According to the Following Measurement Method:

This is a question of measuring the mass of rubber extruded through a calibrated die over a given time (6 hours) and under set conditions (T=100° C.). The die has a diameter of 6.35 mm, a thickness of 0.5 mm and is located at the bottom and at the centre of a 52 mm diameter hollowed-out cylindrical dish.

Placed in this device are 40±4 g of rubber preshaped into a pellet (2 cm thick and 52 mm diameter). A calibrated piston of 1 kg (±5 g) is positioned on the rubber pellet. This assembly is then placed in an oven at 100±0.5° C.

Since the conditions are not stabilized during the first hour in the oven, the product extruded at t=1 hour is cut off and then discarded.

The measurement is then continued for 6 hours±5 min, during which time the product is left in the oven. At the end of the 6 hours, the sample of product extruded is cut off and then weighed. The result of the measurement is the mass of rubber weighed. The lower this result, the better the elastomer withstands cold flow.

(h) Determination of the Dynamic Properties Tan δ Max

The dynamic properties, in particular tan δ max, are measured on a viscosity analyser (Metravib VA4000), according to the ASTM D 5992-96 standard. The response of a sample of vulcanized composition (cylindrical test specimen with a thickness of 2 mm and a cross section of 79 mm²), subjected to a simple alternating sinusoidal shear stress, at a frequency of 10 Hz, under standard temperature conditions (23° C.) according to the ASTM D 1349-99 standard is recorded. A peak-to-peak strain amplitude scan ranging from 0.1% to 50% (forward cycle) then from 50% to 0.1% (return cycle) is carried out. The result made use of is the loss factor tan δ. For the return cycle, the maximum value of tan δ observed (tan δ max) is indicated. This value is representative of the hysteresis of the material and, in the present case, of the rolling resistance: the lower the tan δ max value, the lower the rolling resistance.

(i) Determination of the Distribution of the Species of a Modified Elastomer.

1—Example of Determining the Ratio of the Rate Constants (K) of the Kinetic Model for Functionalization in a Batch Stirred Reactor Experimental Determination of the Weight Percentage of the Chain-End, Middle-Chain and (3-Arm) Star-Shaped Functionalized Chains and of the Change in Viscosity as a Function of the 3-(N,N-dimethylaminopropyl)-trimethoxysilane/n-BuLi Molar Ratio Introduced into eleven 250 mL glass bottles (Steinie bottles) are 91.6 mL (70.5 g) of methylcyclohexane, 14.8 mL (9.65 g) of butadiene and 0.49 mL of a 0.078 mol·L$^{-1}$ solution of tetrahydrofurfuryl ether in methylcyclohexane. After neutralizing the impurities in the solution to be polymerized by addition of n-butyllithium (n-BuLi), 1.90 mL of 0.097 mol·L$^{-1}$ n-BuLi in methylcyclohexane are added. The polymerization is carried out at 60° C.

After 15 minutes, the degree of monomer conversion reaches 95%. This degree is determined by weighing an extract dried at 140° C., under the reduced pressure of 200 mmHg. A control bottle (bottle no. 1) is stopped with an excess of methanol with respect to the lithium. The "initial" inherent viscosity is 0.66 dL·g$^{-1}$. 0.88 mL of a 0.1 mol·L$^{-1}$ solution of 3-(N,N-dimethylaminopropyl)trimethoxysilane in methylcyclohexane is added to the living polymer solutions (0.48 molar eq. vs Li) contained in bottles 2 to 9, 0.73 mL of this same solution is added to bottle 10 (0.40 molar eq. vs Li) and 1.83 mL of this same solution are added to bottle 11 (1.0 molar eq. vs Li). After reacting for 15 minutes at 60° C., the solutions are antioxidized by addition of 0.4 part per hundred parts of elastomer (phr) of 4,4'-methylenebis(2,6-tert-butylphenol) and 0.2 part per hundred parts of elastomer (phr) of N-(1,3-dimethylbutyl)-N'-phenyl-p-phenylenediamine. The polymers thus treated are separated from the solution by drying at 60° C. under reduced pressure and a stream of nitrogen for 12 hours.

The "final" inherent viscosities, the changes in viscosity defined as the ratios of the "final" inherent viscosities to the "initial" inherent viscosity, and also the weight percentages of deactivated chains (P), chain-end functionalized chains (PA), middle-chain functionalized chains (P$_2$A) and star-shaped functionalized chains (P$_3$A) are presented in Table 1 below.

TABLE 1

Change in the distribution of the P + PA/P$_2$A/P$_3$A species and of the change in viscosity as a function of the 3-(N,N-dimethylaminopropyl)trimethoxysilane/n-BuLi molar ratio.

| Bottle | 3-(N,N-dimethylaminopropyl)trimethoxysilane/ Li molar ratio | Viscosity change | P + PA/P$_2$A/P$_3$A (wt. %) |
|---|---|---|---|
| 2 | 0.48 | | 12/77/10 |
| 3 | 0.48 | | 13/77/9 |
| 4 | 0.48 | | 13/78/9 |
| 5 | 0.48 | | 13/82/5 |
| 6 | 0.48 | | 13/83/5 |
| 7 | 0.48 | | 13/83/4 |
| 8 | 0.48 | | 14/83/4 |
| 9 | 0.48 | 1.54 | 11/84/4 |
| 10 | 0.40 | 1.61 | 15/53/25 |
| 11 | 1.00 | 1.09 | 72/20/7 |

The living diene elastomer is functionalized according to the following reaction mechanism:

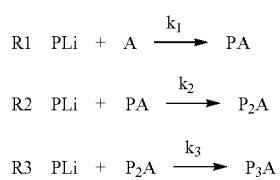

of which the model of the kinetics of the reactions is presumed to be:

$$V_1 = k_1 [PLi][A] \quad \text{R1}$$

$$V_2 = k_2 [PLi][PA] \quad \text{R2}$$

$$V_3 = k_3 [PLi][P_2A] \quad \text{R3}$$

where:
k$_1$, k$_2$ and k$_3$ are the rate constants of the reactions R1, R2 and R3 (m$^3$/mol/s),
[PLi] is the concentration of living chains (mol/m$^3$),
[A] is the concentration of the aminotrialkoxysilane functionalizing agent A (mol/m$^3$). The functionalizing agent A is characterized by a ratio of rate constants K $$K = \frac{k_1}{k_2} = \frac{k_2}{k_3}$$

[PA] is the concentration of chain-end functionalized polymer (mol/m$^3$),
[P$_2$A] is the concentration of middle-chain functionalized polymer (mol/m$^3$),
[P$_3$A] is the concentration of star-shaped polymer (mol/m$^3$).

The functionalizing kinetic model incorporated, according to a person skilled in the art, into a batch perfectly stirred reactor model (bibliography: Villermeaux, J; Génie de la réaction chimique [Chemical reaction engineering]; 1993) makes it possible to determine the distribution of the PLi, PA, P$_2$A and P$_3$A species. Furthermore, the chains may be deactivated (P) during the polymerizing and/or functionalizing step. Thus, the final product is a mixture of deactivated elastomer (P), chain-end functionalized elastomer (PA), middle-chain functionalized elastomer (P$_2$A) and star-shaped elastomer (P$_3$A).

For the experimental points of Table 1 above, the value of K=10$^{2\pm1}$ has been estimated according to the description of the batch perfectly stirred reactor model, which represents the reactor used for these experiments.

Figure 3:
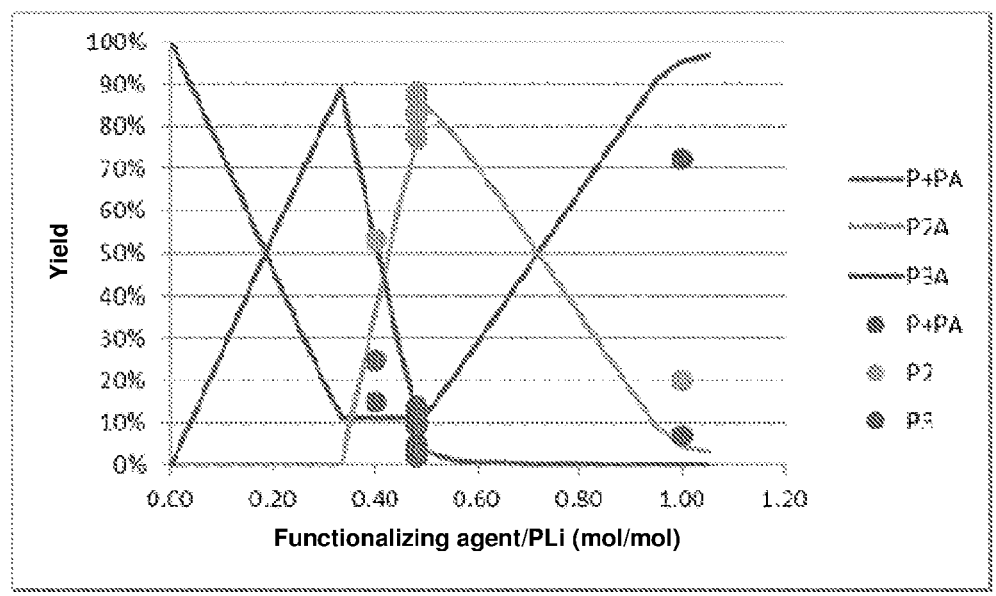
FIG. 3 is a graph illustrating a distribution of P, PA, $P_2A$ and $P_3A$ species as a function of functionalizing agent/living polymer chains (PLi) molar ratio according to Example 1.

FIG. 3 represents the distribution of the P, PA, P$_2$A and P$_3$A species as a function of the functionalizing agent/living polymer chains (PLi) molar ratio: simulated (lines) and measured (points).

2—Example of Determining the Functionalization Kinetics in a Batch Stirred Reactor Experimental Determination of the Weight Percentage of the Chain-End, Middle-Chain and (3-Arm) Star-Shaped Functionalized Chains as a Function of the Coupling Time with 3-(N,N-dimethylaminopropyl)trimethoxysilane (~0.5 Mol. Eq. Vs Li)

Introduced into twenty-two 250 mL glass bottles (Steinie bottles) are 91.6 mL (70.5 g) of methylcyclohexane, 14.8 mL (9.65 g) of butadiene and 0.49 mL of a 0.078 mol·L$^{-1}$ solution of tetrahydrofurfuryl ether in methylcyclohexane. After neutralizing the impurities in the solution to be polymerized by addition of n-butyllithium (n-BuLi), 1.90 mL of 0.097 mol·L$^{-1}$ n-BuLi in methylcyclohexane are added. The polymerization is carried out at 60° C.

After 15 minutes, the degree of monomer conversion reaches 95%. This degree is determined by weighing an extract dried at 140° C., under the reduced pressure of 200 mmHg, 0.88 mL of a 0.1 mol·L$^{-1}$ solution of 3-(N,N-dimethylaminopropyl)trimethoxysilane in methylcyclohexane is added to the living polymer solutions (0.48 molar eq. vs Li) contained in the remaining twenty-one bottles. After reacting for 10 seconds (bottles 12, 13 and 14), 15 seconds (bottles 15, 16 and 17), 20 seconds (bottles 18, 19 and 20), 30 seconds (bottles 21 and 22), 2 minutes (bottle 23) and 15 minutes (bottles 24, 25, 26, 27, 28, 29, 30, 31 and 32) at 60° C., the solutions are antioxidized by addition of 0.4 part per hundred parts of elastomer (phr) of 4,4'-methylenebis(2,6-tert-butylphenol) and 0.2 part per hundred parts of elastomer (phr) of N-(1,3-dimethylbutyl)-N'-phenyl-p-phenylenediamine. The polymers thus treated are separated from the solution by drying at 60° C. under reduced pressure and a stream of nitrogen for 12 hours.

The weight percentages of deactivated chains (P), chain-end functionalized chains (PA), middle-chain functionalized chains ($P_2A$) and star-shaped functionalized chains ($P_3A$) are presented in Table 2 below.

TABLE 2

Change in the distribution of the P + PA/$P_2A$/$P_3A$ species as a function of the reaction time with 3-(N,N-dimethylaminopropyl)trimethoxysilane.

| Bottle | Reaction time with 3-(N,N-dimethylamino-propyl)-trimethoxysilane | P + PA (wt. %) | $P_2A$ (wt. %) | $P_3A$ (wt. %) |
| --- | --- | --- | --- | --- |
| 12 | 10 s | 23 | 76 | 1 |
| 13 | 10 s | 23 | 76 | 1 |
| 14 | 10 s | 22 | 77 | 1 |
| 15 | 15 s | 19 | 79 | 1 |
| 16 | 15 s | 20 | 79 | 1 |
| 17 | 15 s | 19 | 79 | 1 |
| 18 | 20 s | 18 | 81 | 1 |
| 19 | 20 s | 17 | 81 | 1 |
| 20 | 20 s | 18 | 81 | 1 |
| 21 | 30 s | 16 | 82 | 2 |
| 22 | 30 s | 14 | 83 | 2 |
| 23 | 2 min | 11 | 86 | 2 |
| 24 | 15 min | 12 | 77 | 10 |
| 25 | 15 min | 13 | 77 | 9 |
| 26 | 15 min | 13 | 78 | 9 |
| 27 | 15 min | 13 | 82 | 5 |
| 28 | 15 min | 13 | 83 | 4 |
| 29 | 15 min | 13 | 83 | 4 |
| 30 | 15 min | 14 | 83 | 4 |
| 31 | 15 min | 11 | 84 | 4 |
| 32 | 15 min | 9 | 88 | 3 |

Figure 4:
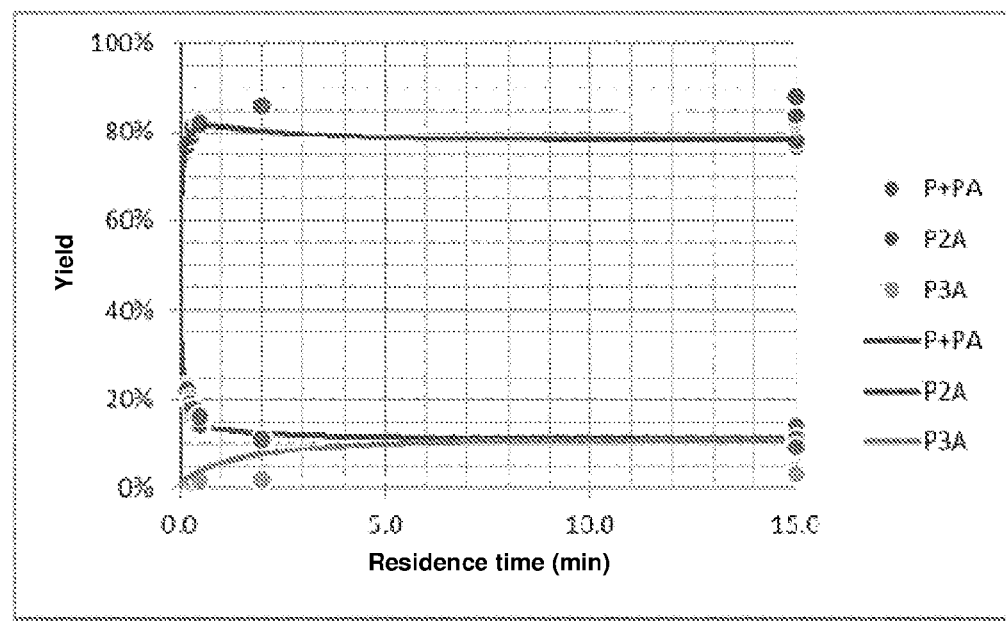
FIG. 4 is a graph comparing simulated yields to measured yields as a function of reaction time in a batch, perfectly stirred reactor according to Example 2.

By using the same kinetic model from the preceding example and the value of $K=10^{2\pm1}$, the value of $k_1[PLi]$, in the kinetic model, is estimated at $10^{4\pm0.2}$. FIG. 4 compares the simulated yields to the measured yields as a function of the reaction time in a batch, perfectly stirred reactor.

3—Example of Determining the Ratio of Functionalization Rate Constants (K) in Continuous Configuration In a continuous polymerization pilot plant, at the outlet of the continuous polymerization stirred reactor, presumed to be perfectly stirred, a variable amount of functionalizing agent is injected in order to characterize the continuous functionalizing section. The functionalizing section is composed of a 4 L, 36 element Kenics static mixer and of a continuous stirred reactor with a volume of 32.5 L that is presumed to be perfectly stirred. The minimum residence time in the stirred reactors is 20 minutes.

Introduced continuously into a 32.5 L continuous stirred reactor, presumed to be perfectly stirred according to a person skilled in the art, are methylcyclohexane, butadiene, styrene and tetrahydrofurfuryl ethyl ether, in the following proportions: mass flow rate of butadiene=2.85 kg·h$^{-1}$, mass flow rate of styrene=1.25 kg·h$^{-1}$, mass concentration of monomer=11 wt. %, 60 ppm tetrahydrofurfuryl ethyl ether. n-Butyllithium (n-BuLi) is introduced in an amount sufficient to neutralize the protic impurities introduced by the various constituents present in the line inlet. At the reactor inlet, 850 µmol of n-BuLi per 100 g of monomers are introduced.

The various flow rates are calculated so that the mean residence time in the reactor is 40 min. The temperature is maintained at 90° C.

The degree of conversion, measured on a sample taken at the reactor outlet, is 92.6%.

On leaving the polymerization reactor, 3-(N,N-dimethylaminopropyl)trimethoxysilane in solution in methylcyclohexane is added to the living polymer solution in various amounts (various 3-(N,N-dimethylaminopropyl)trimethoxysilane/PLi molar ratios) in order to characterize the functionalizing process. This solution is mixed in a Kenics KMR static mixer consisting of 36 mixing elements, then passes through a vacuum tube, the total residence time in the tube being 3 minutes (static mixer+vacuum tube), and a 32.5 L continuous stirred reactor, presumed to be perfectly stirred according to person skilled in the art, having a residence time of 40 minutes. The polymers are then subjected to an antioxidizing treatment with addition of 0.4 phr of 2,2'-methylenebis(4-methyl-6-tert-butylphenol) and 0.2 phr of N-(1,3-dimethylbutyl)-N'-phenyl-p-phenylenediamine.

The polymers thus treated are separated from their solution by a steam stripping operation, then dried on an open mill at 100° C.

Figure 5:
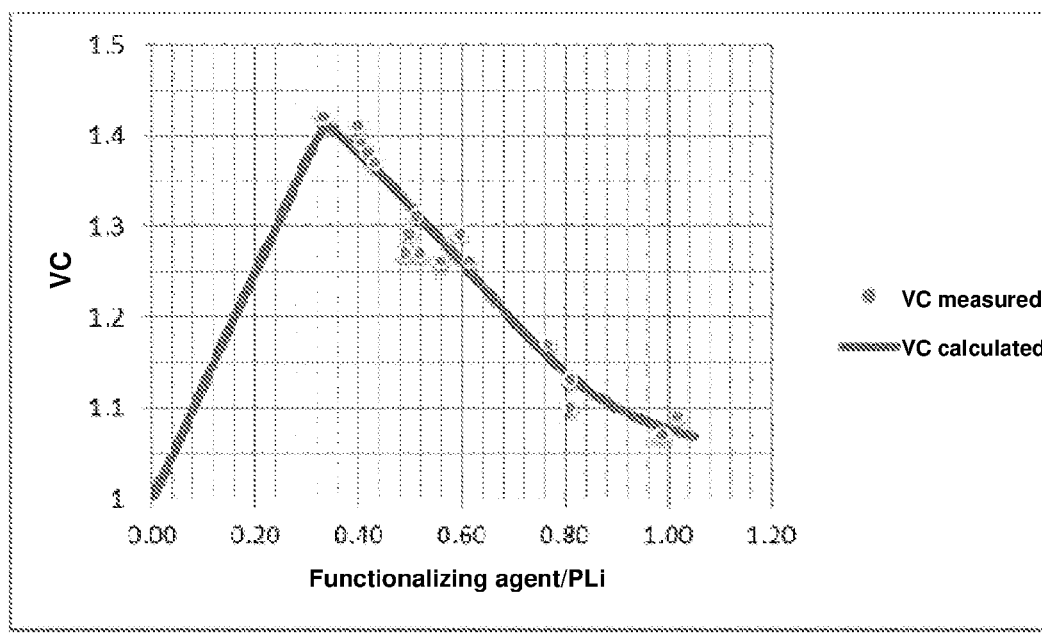
FIG. 5 is a graph illustrating inherent viscosity changes (VC) according to Example 3.

The inherent viscosity changes (VC) measured are presented in FIG. 5.

The functionalizing kinetic model described above is incorporated, according to a person skilled in the art, into a tubular reactor model (representative of the Kenics static mixer) followed by continuous perfectly stirred reactor (representative of the stirred functionalizing reactor) (bibliography: Villermeaux, J; Génie de la réaction chimique [Chemical reaction engineering]; 1993) and makes it possible to determine the distribution of the PLi, P, PA, $P_2A$ and $P_3A$ species.

To make the connection between the distribution of the PLi, P, PA, $P_2A$ and $P_3A$ species calculated by the functionalizing kinetic model and the experimental ratio of inherent viscosities before and after functionalizing (VC), the VC is calculated theoretically by the equation below:

$$VC = \left( \frac{\sum_{i=1}^{n} w_{P_iA} \overline{M}_{w,P_iA}^a g_i'}{\overline{M}_{w,P}^a} \right)$$

where,
$wP_iA$ is the weight fraction of the $P_iA$, PLi, P species;
Mw is the weight-average molecular weight;
a is the parameter from the MHS (Mark Houwink Sakurada) equation and is equal to 0.75
$g_i'$ is a correction for the star-shaped polymers, for example:

$$g_i' = \left( \frac{3i-2}{i^2} \right)^b$$

where,
b is equal to 0.58 (bibliography: Structure and Rheology of Molten Polymers)
assuming that the residence time is long enough to be considered to be infinite, the ratio of the rate constants K is estimated by minimizing the differences in the experimental and calculated VC. The value of K is $10^{1\pm1}$ as represented in FIG. 5.

Figure 6:
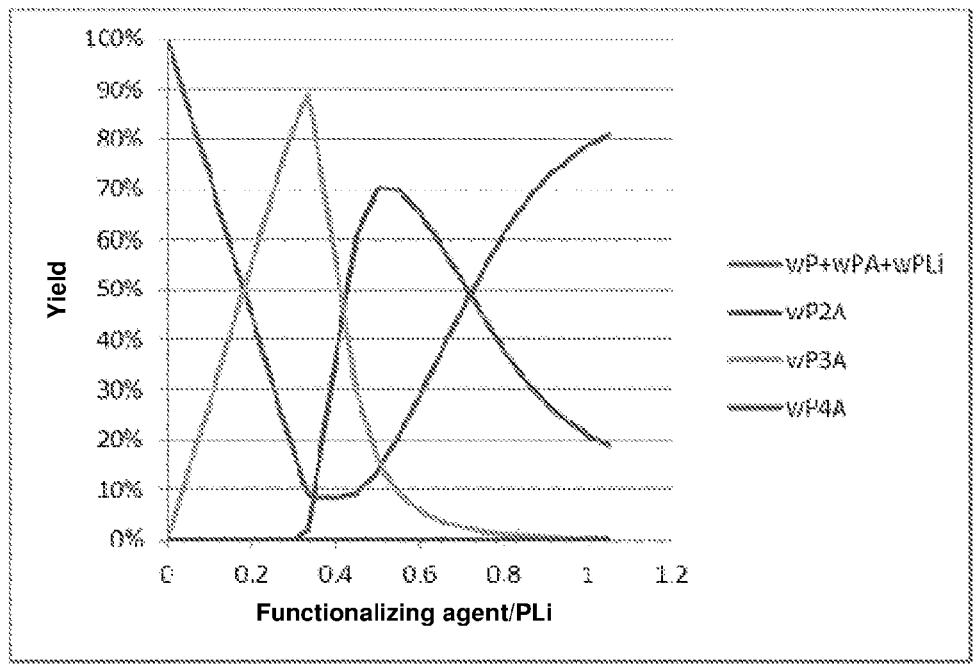
FIG. 6 is a graph illustrating calculated VC determined from a distribution of species calculated by a kinetic model incorporated into a tubular and continuous perfectly stirred reactor models according to Example 3.

The calculated VC is determined from the distribution of species calculated by the kinetic model incorporated into the tubular and continuous perfectly stirred reactor models (FIG. 6).

II—Tests

II-1. Elastomer Preparation

Preparation of Polymer 1: Polymer Functionalized by 3-(N,N-dimethylamino-propyl)trimethoxysilane in the Middle of the Chain According to an Embodiment of the Invention Introduced continuously into a 32.5 L continuous stirred reactor, presumed to be perfectly stirred according to a person skilled in the art, are methylcyclohexane, butadiene, styrene and tetrahydrofurfuryl ethyl ether, in the following proportions: mass flow rate of butadiene=2.85 kg·h$^{-1}$, mass flow rate of styrene=1.25 kg·h$^{-1}$, mass concentration of monomer=11 wt. %, 60 ppm tetrahydrofurfuryl ethyl ether. n-Butyllithium (n-BuLi) is introduced at the line inlet in an amount sufficient to neutralize the protic impurities introduced by the various constituents present in the line inlet. At the reactor inlet, 850 μmol of n-BuLi per 100 g of monomers are introduced.

The various flow rates are calculated so that the mean residence time in the reactor is 40 min. The temperature is maintained at 90° C.

The degree of conversion, measured on a sample taken at the reactor outlet, is 92.6% and the inherent viscosity is 1.68 dL·g$^{-1}$.

On leaving the reactor, 386 micromol, per 100 g of monomers, of 3-(N,N-dimethylaminopropyl)trimethoxysilane in solution in methylcyclohexane are added to the living polymer solution. This solution is mixed in a Kenics KMR static mixer consisting of 36 mixing elements, then passes through a vacuum tube, the total residence time in the tube being 3 minutes (static mixer+vacuum tube), and in a 32.5 L continuous stirred reactor, presumed to be perfectly stirred according to a person skilled in the art, having a residence time of 40 minutes. The polymer is then subjected to an antioxidizing treatment with addition of 0.4 phr of 2,2'-methylenebis(4-methyl-6-tert-butylphenol) and 0.2 phr of N-(1,3-dimethylbutyl)-N'-phenyl-p-phenylenediamine.

The polymer thus treated is separated from its solution by a steam stripping operation, then dried on an open mill at 100° C., in order to obtain the polymer 1 functionalized by 3-(N,N-dimethylaminopropyl)trimethoxysilane in the middle of the chain according to an embodiment of the invention.

The inherent viscosity of this polymer 1 is 2.15 dL·g$^{-1}$, the change in viscosity is 1.28 and the ML$_{(1+4)}$100° C. viscosity is 72.0. The number-average molar mass Mn of the polymer, determined by the conventional SEC technique, is 145 000 g·mol$^{-1}$ and the polydispersity index Ip is 1.72. The CF$_{(1+6)}$100° C. cold flow of this elastomer is 0.452.

The microstructure of this polymer is determined by the NIR method: the weight content of 1,2-units is 24.1%, this content relating to the butadiene units. The weight content of styrene is 26.5%.

Preparation of Polymer 2: Polymer Functionalized by 3-(N,N-dimethylaminopropyl)trimethoxysilane in the Middle of the Chain According to an Embodiment of the Invention Introduced continuously into a 32.5 L continuous stirred reactor, presumed to be perfectly stirred according to a person skilled in the art, are methylcyclohexane, butadiene, styrene and tetrahydrofurfuryl ethyl ether, in the following proportions: mass flow rate of butadiene=2.85 kg·h$^{-1}$, mass flow rate of styrene=1.25 kg·h$^{-1}$, mass concentration of monomer=11 wt. %, 60 ppm tetrahydrofurfuryl ethyl ether. n-Butyllithium (n-BuLi) is introduced at the line inlet in an amount sufficient to neutralize the protic impurities introduced by the various constituents present in the line inlet. At the reactor inlet, 845 μmol of n-BuLi per 100 g of monomers are introduced.

The various flow rates are calculated so that the mean residence time in the reactor is 40 min. The temperature is maintained at 90° C.

The degree of conversion, measured on a sample taken at the reactor outlet, is 92.7% and the inherent viscosity is 1.66 dL·g$^{-1}$.

On leaving the reactor, 396 micromol, per 100 g of monomers, of 3-(N,N-dimethylaminopropyl)trimethoxysilane in solution in methylcyclohexane are added to the living polymer solution. This solution is mixed in a Kenics KMR static mixer consisting of 36 mixing elements, then passes through a vacuum tube, the total residence time in the tube being 3 minutes (static mixer+vacuum tube). The polymer is then subjected to an antioxidizing treatment with addition of 0.4 phr of 2,2'-methylenebis(4-methyl-6-tert-butylphenol) and 0.2 phr of N-(1,3-dimethylbutyl)-N'-phenyl-p-phenylenediamine.

The polymer thus treated is separated from its solution by a steam stripping operation, then dried on an open mill at 100° C., in order to obtain the polymer 2 functionalized by 3-(N,N-dimethylaminopropyl)trimethoxysilane in the middle of the chain according to an embodiment of the invention.

The inherent viscosity of this polymer 2 is 2.12 dL·g$^{-1}$, the change in viscosity is 1.28 and the ML$_{(1+4)}$100° C. viscosity is 70.4. The number-average molar mass Mn of the polymer, determined by the conventional SEC technique, is 142 000 g·mol$^{-1}$, the molar mass and the polydispersity index Ip is 1.73. The CF$_{(1+6)}$100° C. cold flow of this elastomer is 0.614.

The microstructure of this polymer is determined by the NIR method: the weight content of 1,2-units is 23.6%, this content relating to the butadiene units. The weight content of styrene is 26.6%.

Preparation of Polymer 3: Polymer Functionalized by 3-(N,N-dimethylaminopropyl)trimethoxysilane in the Middle of the Chain Introduced continuously into a 32.5 L continuous stirred reactor, presumed to be perfectly stirred according to a person skilled in the art, are methylcyclohexane, butadiene, styrene and tetrahydrofurfuryl ethyl ether, in the following proportions: mass flow rate of butadiene=2.85 kg·h$^{-1}$, mass flow rate of styrene=1.25 kg·h$^{-1}$, mass concentration of monomer=11 wt. %, 60 ppm tetrahydrofurfuryl ethyl ether. n-Butyllithium (n-BuLi) is introduced at the line inlet in an amount sufficient to neutralize the protic impurities introduced by the various constituents present in the line inlet. At the reactor inlet, 840 μmol of n-BuLi per 100 g of monomers are introduced.

The various flow rates are calculated so that the mean residence time in the reactor is 40 min. The temperature is maintained at 90° C.

The degree of conversion, measured on a sample taken at the reactor outlet, is 93.5% and the inherent viscosity is 1.66 dL·g$^{-1}$.

This living polymer solution is introduced continuously into a second 32.5 L continuous stirred reactor, presumed to be perfectly stirred according to a person skilled in the art, having a residence time of 40 minutes, into which 393 micromol, per 100 g of monomers, of 3-(N,N-dimethylaminopropyl)trimethoxysilane in solution in methylcyclohexane are introduced continuously.

The polymer is then subjected to an antioxidizing treatment with addition of 0.4 phr of 2,2'-methylenebis(4-methyl-6-tert-butylphenol) and 0.2 phr of N-(1,3-dimethylbutyl)-N'-phenyl-p-phenylenediamine.

The polymer thus treated is separated from its solution by a steam stripping operation, then dried on an open mill at 100° C., in order to obtain the polymer 3 functionalized by 3-(N,N-dimethylaminopropyl)trimethoxysilane in the middle of the chain.

The inherent viscosity of this polymer 3 is 2.14 dL·g$^{-1}$, the change in viscosity is 1.29 and the $ML_{(1+4)}$100° C. viscosity is 76.4. The number-average molar mass Mn of the polymer, determined by the conventional SEC technique, is 144 000 g·mol$^{-1}$, and the polydispersity index Ip is 1.80. The $CF_{(1+6)}$100° C. cold flow of this elastomer is 0.216.

The microstructure of this polymer is determined by the NIR method: the weight content of 1,2-units is 24.4%, this content relating to the butadiene units. The weight content of styrene is 27.0%.

The characteristics of the various elastomers are listed in Table 3:

TABLE 3

|  | Examples | | Comparative example |
|---|---|---|---|
|  | 1 | 2 | 3 |
| $ML_{(1+4)}$ 100° C. | 72.0 | 70.4 | 76.4 |
| $CF_{(1+6)}$ 100° C. | 0.452 | 0.614 | 0.216 |
| Viscosity change (dL · g$^{-1}$) | 1.28 | 1.28 | 1.29 |
| Non-functional chains (%) * | 8.0 | 8.0 | 8.0 |
| Unfunctionalized living chains (%) * | 0.0 | 5.4 | 0.0 |
| Chain-end functionalized chains (%) * | 5.4 | 9.0 | 8.9 |
| Middle-chain functionalized chains (%) * | 70.5 | 66.8 | 51.3 |
| Star-shaped chains (%) * | 16.1 | 10.8 | 31.8 |

* Theoretical estimate of the chain distributions (working on the assumption of the reaction mechanism (above), the kinetic model (above) and K = 10)

II-2. Preparation of the Compositions

The procedure for the tests below is as follows: the previously synthesized modified diene elastomers are introduced into an 85 cm³ Polylab internal mixer, which is filled to 70% and the initial vessel temperature of which is around 110° C.

Next, the reinforcing fillers, the coupling agent and then, after 1 to 2 minutes of kneading, the various other ingredients, with the exception of the vulcanization system, are introduced into the mixer. Thermomechanical working (non-productive phase) is then carried out in one step (total kneading time equal to around 5 min), until a maximum "dropping" temperature of 160° C. is reached. The resulting mixture is recovered and cooled and then the vulcanization system (sulphur) is added on an external mixer (homo-finisher) at 25° C., with everything being mixed (productive phase for around 5 to 6 min.

The resulting compositions are subsequently calendered in the form of slabs (thickness of 2 to 3 mm) or thin sheets of rubber for the measurement of their physical or mechanical properties.

The rubber compositions are given in Table 4. The amounts are expressed in parts per 100 parts by weight of elastomer (phr).

TABLE 4

|  | Examples | | Comparative example |
|---|---|---|---|
| Composition | 1 | 2 | 3 |
| Polymer 1 | 100 | | |
| Polymer 2 | | 100 | |
| Polymer 3 | | | 100 |
| Silica (1) | 80 | 80 | 80 |
| N234 | 1 | 1 | 1 |
| MES oil (2) | 15 | 15 | 15 |
| Resin (3) | 15 | 15 | 15 |
| Coupling agent (4) | 6.4 | 6.4 | 6.4 |
| ZnO | 2.5 | 2.5 | 2.5 |
| Stearic acid | 2 | 2 | 2 |
| Antioxidant (5) | 1.9 | 1.9 | 1.9 |
| Anti-ozone wax "C32ST" (6) | 1.5 | 1.5 | 1.5 |
| Diphenylguanidine | 1.5 | 1.5 | 1.5 |
| Sulphur | 1.2 | 1.2 | 1.2 |
| Sulphenamide (7) | 2 | 2 | 2 |

(1) "Zeosil 1165MP" silica from Rhodia.
(2) Catenex ® SBR from Shell.
(3) Dercolyte L120 resin from DRT.
(4) "Si69" from Degussa.
(5) N-(1,3-dimethylbutyl)-N'-phenyl-p-phenylenediamine.
(6) Anti-ozone from Repsol.
(7) N-cyclohexyl-2-benzothiazylsulphenamide.

The results of dynamic property measurements are expressed in Table 5 below:

TABLE 5

|  | Examples | | Comparative example |
|---|---|---|---|
| Compositions | 1 | 2 | 3 |
| tan δ max 23° C. | 0.197 | 0.203 | 0.217 |

It is observed that elastomers 1 and 2 have cold flow values that are considered to be low enough to limit the flow problems, while minimizing, in the reinforced rubber composition, the tan δ value, expressing a reduced hysteresis. Conversely, elastomer 3 has an even lower cold flow value, but to the detriment of the hysteresis of the reinforced rubber composition containing it. The cold flow of the elastomers/hysteresis of the rubber composition containing them compromise is optimized and entirely satisfactory for elastomers 1 and 2 according to an embodiment of the invention.

The invention claimed is:

1. A method for the continuous synthesis of a modified diene elastomer, comprising the steps:
   of anionic polymerization of at least one conjugated diene monomer in the presence of a polymerization initiator,
   of modifying the diene elastomer in a functionalizing device, by bringing the living diene elastomer bearing an active site obtained in the previous step into contact, in a single step, with a non-polymerizable functionalizing agent comprising a trialkoxysilane group, and optionally a function capable of interacting with a reinforcing filler,
   the modification comprising three reactions in series

| Reactions | Mechanism |
|---|---|
| R1 | PLi + A $\xrightarrow{k_1}$ PA |
| R2 | PLi + PA $\xrightarrow{k_2}$ P$_2$A |
| R3 | PLi + P$_2$A $\xrightarrow{k_3}$ P$_3$A | where
A represents the functionalizing agent,
PLi represents a living elastomer chain,
PA represents the chain-end functionalized elastomer,
$P_2A$ represents the coupled elastomer,
$P_3A$ represents the three-arm star-shaped elastomer, and
$k_i$ represents the rate constant of the reaction $R_i$, that are carried out according to the following rate law:

| Reactions | Rate of reaction |
|---|---|
| R1 | $V_1 = k_1[PLi][A]$ |
| R2 | $V_2 = k_2[PLi][PA]$ |
| R3 | $V_3 = k_3[PLi][P_2A]$ | where
$k_1$, $k_2$ and $k_3$ are the rate constants respectively of the reactions R1, R2 and R3 (expressed in $(m^3/mol) \cdot s^{-1}$),
[PLi] is the concentration of living chains (expressed in $mol/m^3$),
[A] is the concentration of modifying agent A (expressed in $mol/m^3$),
[PA] is the concentration of chain-end functionalized elastomer (expressed in $mol/m^3$),
[$P_2A$] is the concentration of coupled elastomer (expressed in $mol/m^3$),
[$P_3A$] is the concentration of the three-arm star-shaped elastomer (expressed in $mol/m^3$),
with a ratio of the rate constants, defined as:

$$K = \frac{k_1}{k_2} = \frac{k_2}{k_3},$$

of greater than 1, and
the residence time distribution in a functionalizing device (i) or (ii) is expressed respectively according to equations 1 or 3 below:
(i) in a functionalizing device having at least one tubular continuous reactor or having at least one cascade of at least two stirred reactors, $$E_1(t) = \frac{1}{2}\left(\frac{P}{\pi\theta_1 t}\right)^{\frac{1}{2}} e^{-\frac{P(\theta_1-t)^2}{4\theta_1 t}} \quad \text{Eq 1}$$

in which:
P is the dimensionless parameter of resistance to dispersion,
$\theta_1$ is the residence time defined as the reactor volume/total volume flow rate ratio, equal to at least 0.1 minute and at most to 10 minutes,
t is the variable time of the residence time distribution,
(ii) in a functionalizing device that is a combination of the device (i) and of a device having at least one continuous stirred reactor, having a residence time distribution characterized by the following equation:

$$E_2(t) = \frac{e^{\left(-\frac{t}{\theta_2}\right)}}{\theta_2} \quad \text{Eq 2}$$

in which:
$\theta_2$ is the residence time defined as the reactor volume/total volume flow rate ratio, between 0 and 60 minutes,
t is the variable time of the residence time distribution,
the device (ii) having a residence time distribution characterized by the equation 3 below, which is the result of the convolution of equations 1 and 2:

$$E_{12}(t) = \int_0^t E_1(t-T)E_2(T)\,dT \quad \text{Eq 3}$$

$$E_{12}(t) = \int_0^t \frac{1}{2}\left(\frac{P}{\pi\theta_1(t-T)}\right)^{\frac{1}{2}} e^{-\frac{P(\theta_1-(t-T))^2}{4\theta_1(t-T)}} \frac{e^{\left(-\frac{T}{\theta_2}\right)}}{\theta_2}\,dT$$

in which:
$\theta_1$ and $\theta_2$ are the residence times as defined above,
P is the dimensionless parameter of resistance to dispersion,
t is the variable time of the residence time distribution,
T is the integration variable.

2. The method for the continuous synthesis of a modified diene elastomer according to claim 1, wherein K is greater than or equal to 10.

3. The method according to claim 1, wherein P is greater than 6.9.

4. The method according to claim 3, wherein P is greater than or equal to 9.6.

5. The method according to claim 1, wherein the functionalizing agent is represented by formula 1:

Formula 1 in which,
R is a $C_1$-$C_{18}$ cyclic or non-cyclic, saturated or unsaturated, aliphatic or $C_6$-$C_{18}$ aromatic divalent hydrocarbon radical,
X is a hydrogen atom or a function capable of interacting with a reinforcing filler,
the R' radicals, which are substituted or unsubstituted, identical or different, represent a $C_1$-$C_{10}$.

6. The method according to claim 5, wherein X is a function capable of interacting with a reinforcing filler selected from cyclic or non-cyclic, primary, secondary or tertiary amines, isocyanates, imines, cyano compounds, thiols, carboxylates, epoxides and primary, secondary or tertiary phosphines.

7. The method according to claim 6, wherein the function capable of interacting with a reinforcing filler is a secondary amine optionally protected by a trialkylsilyl group or a tertiary amine, the nitrogen atom being substituted by $C_1$-$C_{10}$ alkyl radicals.

8. The method according to claim 7, wherein the functionalizing agent is selected from 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane, 3-(N,N-dipropylaminopropyl)trimethoxysilane, 3-(N,N-dipropylaminopropyl)triethoxysilane, 3-(N,N-dibutylaminopropyl)

trimethoxysilane, 3-(N,N-dibutylaminopropyl) triethoxysilane, 3-(N,N-dipentylaminopropyl) trimethoxysilane, 3-(N,N-dipentylaminopropyl) triethoxysilane, 3-(N,N-dihexylaminopropyl) trimethoxysilane, 3-(N,N-dihexylaminopropyl) triethoxysilane, 3-(hexamethyleneaminopropyl) trimethoxysilane and 3-(hexamethyleneaminopropyl) triethoxysilane.

9. The method according to claim 7, wherein the nitrogen atom is substituted by $C_1$-$C_4$ alkyl radicals.

10. The method according to claim 9, wherein the nitrogen atom is substituted by a methyl or ethyl radical.

11. The method according to claim 6, wherein the function capable of interacting with a reinforcing filler is a cyclic amine that forms a heterocycle containing a nitrogen atom and at least one carbon atom.

12. The method according to claim 11, wherein the cyclic amine contains 2 to 6 carbon atoms.

13. The method according to claim 5, wherein R is a $C_1$-$C_{10}$ aliphatic, linear or branched, divalent hydrocarbon radical.

14. The method according to claim 13, wherein R is a $C_3$ linear hydrocarbon radical.

15. The method according to claim 1, further comprising subsequent to the modification step, a step of deprotection when the function capable of interacting with the reinforcing filler is a protected primary or secondary amine, protected thiol or protected primary or secondary phosphine function.

16. The method according to claim 1, further comprising subsequent to the modification step, a step of hydrolysis of the modified elastomer obtained in the preceding step.

17. The method according to claim 1, wherein the molar ratio of the functionalizing agent to the polymerization initiator has a value ranging from 0.40 to 0.75.

18. The method according to claim 1, wherein the molar ratio of the functionalizing agent to the polymerization initiator has a value ranging from 0.15 to 0.40.

19. The method according to claim 1, wherein the molar ratio of the functionalizing agent to the polymerization initiator has a value greater than or equal to 0.75.

20. A modified diene elastomer obtained according to the continuous synthesis method as described in claim 1.

21. The method according to claim 1, wherein the residence time $\theta_1$ is at most 5 minutes and the residence time $\theta_2$ is between 5 and 50 minutes.

\* \* \* \* \*